US011537936B2

(12) United States Patent
Matcha et al.

(10) Patent No.: US 11,537,936 B2
(45) Date of Patent: Dec. 27, 2022

(54) DATA SET GENERATION FOR TESTING OF MACHINE LEARNING PIPELINES

(71) Applicant: ServiceNow, Inc., Santa Clara, CA (US)

(72) Inventors: Venu Madhav Matcha, Fremont, CA (US); Sriram Palapudi, Santa Clara, CA (US); Baskar Jayaraman, Fremont, CA (US); Hongqiao Li, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 1016 days.

(21) Appl. No.: 16/250,770

(22) Filed: Jan. 17, 2019

(65) Prior Publication Data

US 2020/0234177 A1    Jul. 23, 2020

(51) Int. Cl.
*G06N 20/00*    (2019.01)
*G06K 9/62*    (2022.01)
*G06F 16/2455*    (2019.01)
*G06F 16/22*    (2019.01)

(52) U.S. Cl.
CPC ......... *G06N 20/00* (2019.01); *G06F 16/2282* (2019.01); *G06F 16/2456* (2019.01); *G06K 9/6256* (2013.01)

(58) Field of Classification Search
CPC . G06F 16/2282; G06F 16/2456; G06N 20/00; G06K 9/6256
See application file for complete search history.

(56) References Cited

U.S. PATENT DOCUMENTS

| | | |
|---|---|---|
| 6,609,122 B1 | 8/2003 | Ensor |
| 6,678,887 B1 | 1/2004 | Hallman |
| 7,020,706 B2 | 3/2006 | Cates |
| 7,028,301 B2 | 4/2006 | Ding et al. |
| 7,062,683 B2 | 6/2006 | Warpenburg |
| 7,131,037 B1 | 10/2006 | LeFaive |
| 7,170,864 B2 | 1/2007 | Matharu |
| 7,219,085 B2 | 5/2007 | Buck et al. |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |

(Continued)

*Primary Examiner* — Dangelino N Gortayo
(74) *Attorney, Agent, or Firm* — Fletcher Yoder PC

(57) ABSTRACT

A system may include memory containing: (i) a master data set representable in columns and rows, and (ii) a query expression. The system may include a software application configured to apply a machine learning (ML) pipeline to an input data set. The system may include a computing device configured to: obtain the master data set and the query expression; apply the query expression to the master data set to generate a test data set, where applying the query expression comprises, based on content of the query expression, generating the test data set to have one or more columns or one or more rows fewer than the master data set; apply the ML pipeline to the test data set, where applying the ML pipeline results in either generation of a test ML model from the test data set or indication of an error in the test data set; and delete the test data set from the memory.

20 Claims, 14 Drawing Sheets

(56) References Cited

U.S. PATENT DOCUMENTS

| | | |
|---|---|---|
| 7,925,981 B2 | 4/2011 | Pourheidar |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 8,983,982 B2 | 3/2015 | Rangarajan |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,508,051 B2 | 11/2016 | Falk |
| 9,535,737 B2 | 1/2017 | Joy |
| 9,557,979 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 11,269,911 B1 * | 3/2022 | Jones ............... G06F 16/254 |
| 2008/0082968 A1 | 4/2008 | Chang et al. |
| 2019/0095817 A1 * | 3/2019 | Ma ..................... G06F 7/08 |
| 2019/0121673 A1 * | 4/2019 | Gold ................... G06T 1/20 |
| 2019/0220767 A1 * | 7/2019 | Vigoda ............ G06Q 30/0201 |
| 2019/0228261 A1 * | 7/2019 | Chan ................ G06F 16/221 |
| 2020/0193313 A1 * | 6/2020 | Ghanta ........... G06F 16/9038 |

* cited by examiner

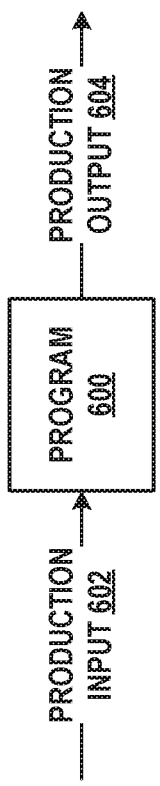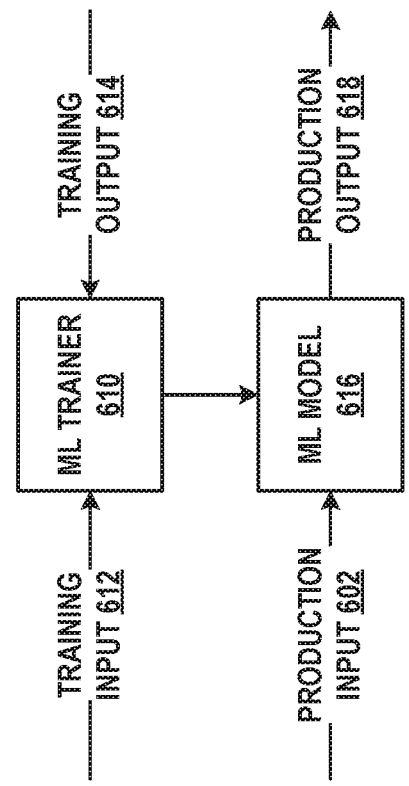

700

| ORIGINATOR | BOB SMITH | ← 702 |
|---|---|---|
| CREATED | 2018-02-07 9:56AM | ← 704 |
| SHORT DESCRIPTION | CAN'T CONNECT TO EMAIL | ← 705 |
| PROBLEM DESCRIPTION | MY EMAIL CLIENT IS NOT DOWNLOADING NEW EMAILS. I AM CONNECTED TO THE WIRELESS NETWORK AND CAN ACCESS THE INTERNET, BUT MY CLIENT KEEPS REPORTING THAT IT IS UNABLE TO ACCESS THE SERVER. | ← 706 |
| CATEGORY | EMAIL | ← 708 |
| ASSIGNED TO | ALICE JONES | ← 710 |
| STATUS | RESOLVED | ← 712 |
| RESOLUTION | BOB'S LAPTOP WAS CONNECTED TO THE "GUEST" WIRELESS NETWORK, WHICH IS OUTSIDE OF THE FIREWALL. I TOLD HIM THAT HE COULD EITHER USE THE VPN TO ACCESS HIS EMAIL, OR CONNECT TO THE "EMPLOYEE" WIRELESS NETWORK, WHICH REQUIRES THE PASSWORD BUT IS INSIDE THE FIREWALL. | ← 714 |
| RESOLVED TIME | 2018-02-07 10:10AM | ← 716 |
| CLOSURE CODE | SOLVED (PERMANENTLY) | ← 718 |
| NOTES | THIS IS THE THIRD TIME IN A WEEK THAT I'VE HAD TO ADDRESS A SIMILAR ISSUE. CAN WE POST WIRELESS NETWORKING INSTRUCTIONS IN ALL CONFERENCE ROOMS? | ← 720 |
| LINK TO KNOWLEDGE BASE | ITKB/WIRELESS/CONFIGURATION.HTML | ← 722 |

FIG. 7

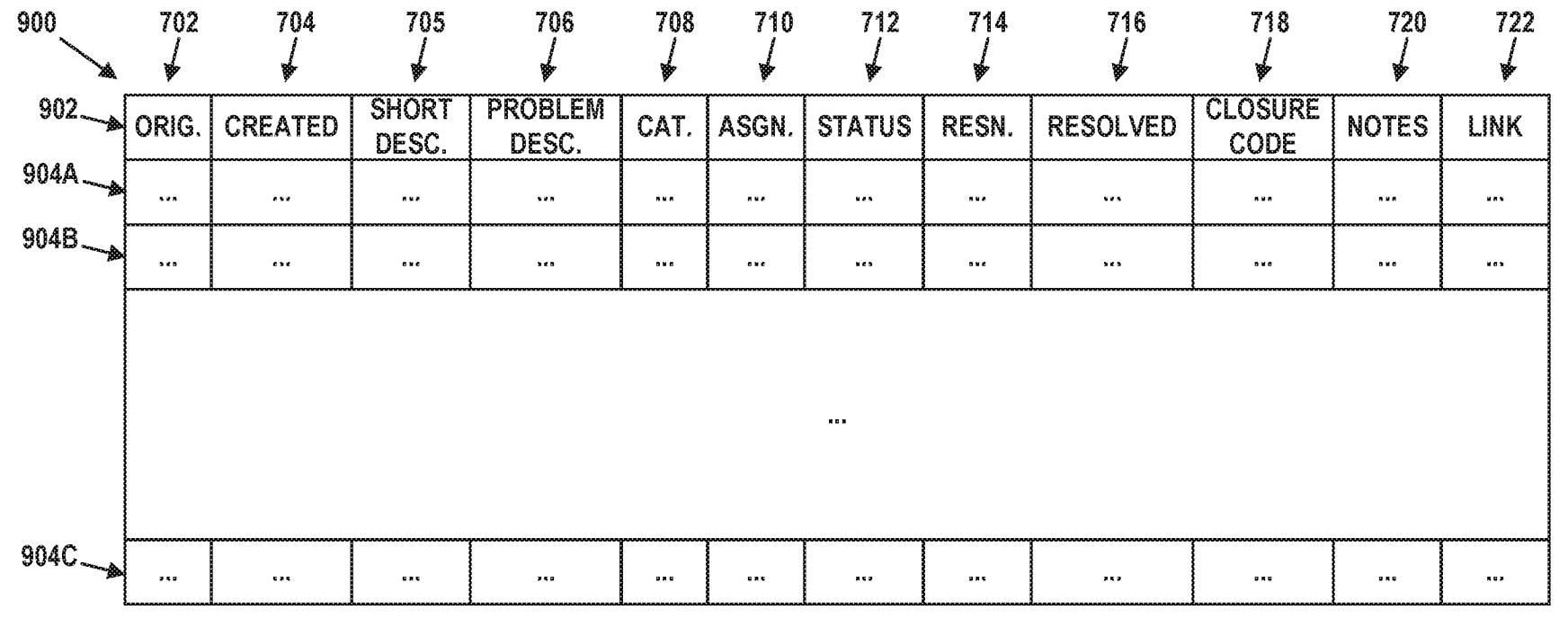

| 900 | 902 | | | | | | | | | | | |
|---|---|---|---|---|---|---|---|---|---|---|---|---|
| | | ORIG. 702 | CREATED 704 | SHORT DESC. 705 | PROBLEM DESC. 706 | CAT. 708 | ASGN. 710 | STATUS 712 | RESN. 714 | RESOLVED 716 | CLOSURE CODE 718 | NOTES 720 | LINK 722 |
| 904A | | ... | ... | ... | ... | ... | ... | ... | ... | ... | ... | ... | ... |
| 904B | | ... | ... | ... | ... | ... | ... | ... | ... | ... | ... | ... | ... |
| 904C | | ... | ... | ... | ... | ... | ... | ... | ... | ... | ... | ... | ... |

FIG. 9

DATA SET GENERATION FOR TESTING OF MACHINE LEARNING PIPELINES

BACKGROUND

Machine learning (ML) systems often use extensive data sets for training of ML models. These ML models are then tested and deployed for production use. But ML systems are highly sensitive to the quality of their training data sets. If such a data set contains anomalies, errors, or undesirable or non-representative statistical characteristics, the resulting ML model will have limited value at best. In the worst case, the ML model will provide misleading or useless results. Since the amount of time to train an ML model can be on the order of hours or days, it is desirable to be able to avoid these situations.

SUMMARY

The embodiments herein involve an ML trainer that provides a pipeline. The pipeline prepares and analyzes the training data before attempting to build an ML model using this data. If the training data exhibits statistical or other characteristics that would likely prevent the resulting ML model from performing well or in a desired fashion, the ML trainer may report an error rather than build the ML model. This avoids wasting computational resources building ML models that have limited or no practical use due to poor training data sets.

In order to ensure that this pipeline operates properly (e.g., only proceeding to build an ML model when the training data set is expected to build a sufficiently useful ML model), the pipeline is validated with test data sets. In particular, it is desirable to be able to generate test data sets with particular distributions of data and values in order to exercise the boundary conditions and thresholds of the pipeline.

But synthetically generating test data sets for ML systems can be challenging. These data sets often need to be large (e.g., 10,000 or more entries), and exhibit certain internal characteristics and consistencies for the ML model's problem domain. For example, an ML model that involves making a prediction based on natural language processing of human-entered sentence text should be tested with data that accurately represents such sentences. Programmatically creating such sentences, especially when the topics and diction thereof are specific to a particular problem domain, is currently an open problem and can be intractable in practice.

Rather than attempt to synthetically generate data sets for testing ML models, the embodiments herein provide mechanisms through which test data sets can be selected from a master data set that has been gathered during production. The master data set may be very large in some circumstances (e.g., containing hundreds of thousands or millions of entries), and is expected to accurately represent both the characteristics of data from the ML model's problem domain and the statistical properties thereof.

The selection of test data sets is carried out by a sophisticated filtering technique that allows subsets of the master data set to be chosen so that a test data set has, for example, a particular distribution of values and/or a particular density in a specific dimension. Additionally, the filtering technique can specify a range of dates, replace certain strings in the master data set with other strings, translate strings to a different language, and merge two or more master data sets for purposes of filtering. Such a filter can be defined using a filter specification in a query language, for example.

As a result, arbitrary production-quality test data sets can be dynamically generated from one or more master data sets. Doing so increases the quality of the pipeline testing process, and avoids having to dedicate a massive amount of storage for retention of test data sets. For a given test, the relevant test data set(s) are be generated, used, and then deleted. Only the master data set and the filter specifications (which are inconsequentially small in comparison to the data sets) need to be stored.

Accordingly, a first example embodiment may involve memory containing: (i) a master data set representable in columns and rows, where the columns define fields of the master data set and the rows define entries in the master data set, and (ii) a query expression. The first example embodiment may also involve a software application configured to apply an ML pipeline to an input data set, where the ML pipeline includes a build determination phase and an ML model building phase, where the build determination phase decides whether to invoke the ML model building phase based on characteristics of the input data set, and where the ML model building phase generates an ML model from the input data set. The first example embodiment may also include a computing device configured to: obtain, from the memory, the master data set and the query expression; apply the query expression to the master data set to generate a test data set from the master data set, where applying the query expression comprises, based on content of the query expression, generating the test data set to have one or more columns or one or more rows fewer than the master data set; store, in the memory, the test data set; apply, by way of the software application, the ML pipeline to the test data set, where applying the ML pipeline results in either generation of a test ML model from the test data set or indication of an error in the test data set; and possibly after applying the ML pipeline to the test data set, delete the test data set from the memory.

A second example embodiment may involve obtaining, by a computing device and from a memory, a master data set and a query expression, where the master data set is representable in columns and rows, and where the columns define fields of the master data set and the rows define entries in the master data set. The second example embodiment may also involve applying, by the computing device, the query expression to the master data set to generate a test data set from the master data set, where applying the query expression comprises, based on content of the query expression, generating the test data set to have one or more columns or one or more rows fewer than the master data set. The second example embodiment may also include storing, by the computing device and in the memory, the test data set. The second example embodiment may also include applying, by the computing device, an ML pipeline to the test data set, where the ML pipeline includes a build determination phase and an ML model building phase, where the build determination phase decides whether to invoke the ML model building phase based on characteristics of an input data set, where the ML model building phase generates an ML model from the input data set, and where applying the ML pipeline results in either generation of a test ML model from the test data set or indication of an error in the test data set. The second example embodiment my also include, possibly after applying the ML pipeline to the test data set, deleting, by the computing device, the test data set from the memory.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6A depicts a traditional programming procedure, in accordance with example embodiments.

FIG. 6B depicts a machine learning procedure, in accordance with example embodiments.

FIG. 7 depicts an incident report, in accordance with example embodiments.

FIG. 9 depicts a table of incident reports, in accordance with example embodiments.

DETAILED DESCRIPTION

Figure 1:
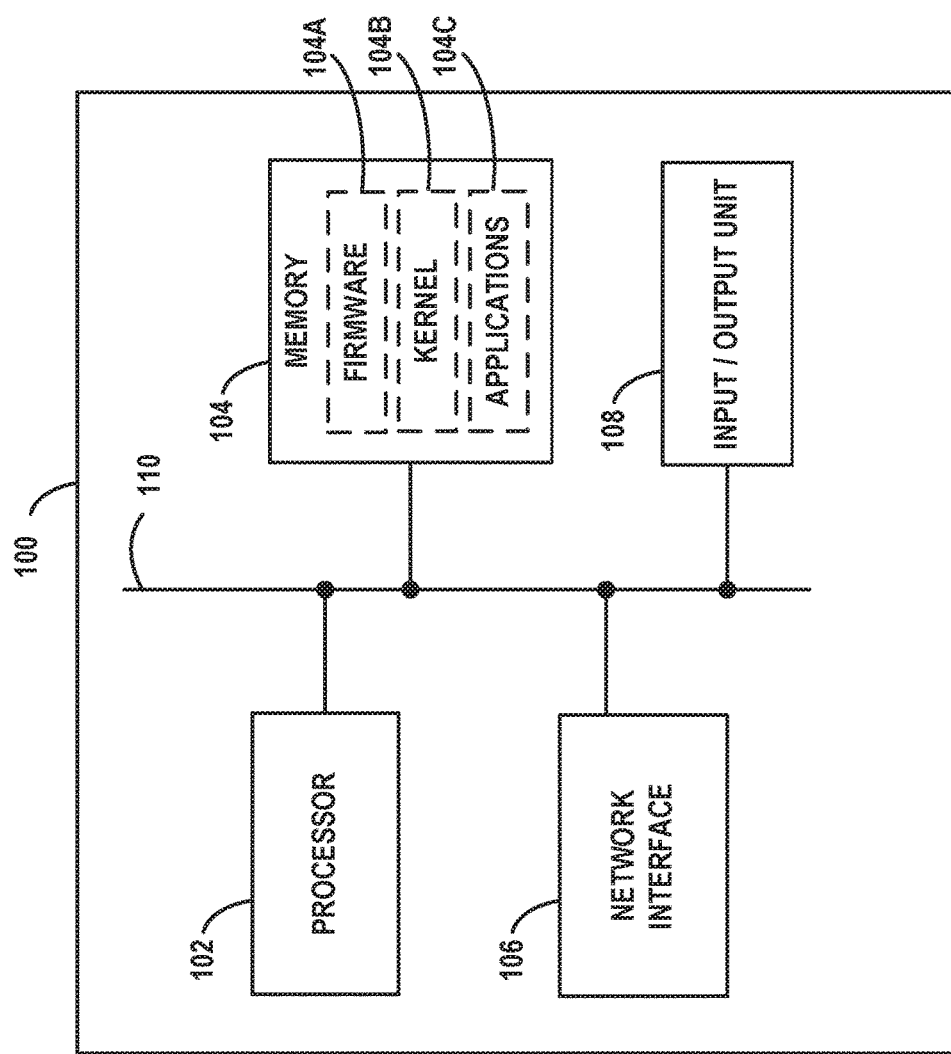
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality.

Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
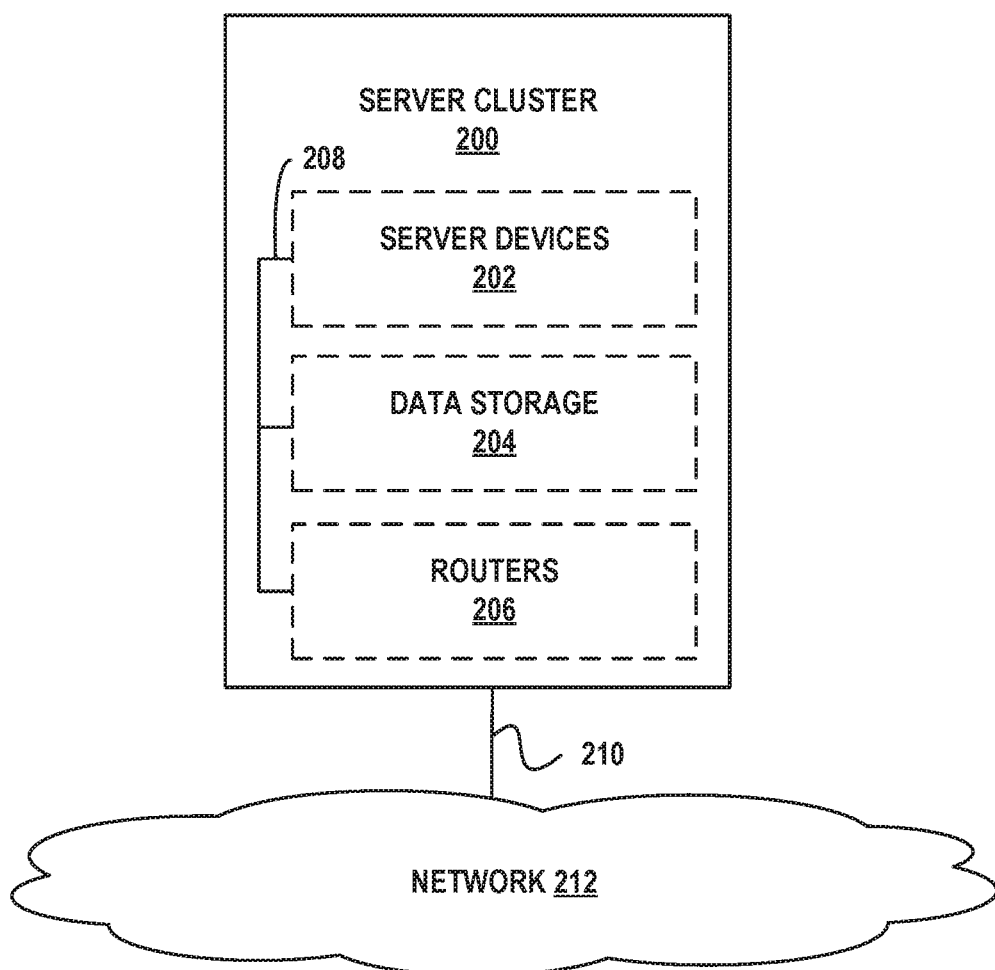
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
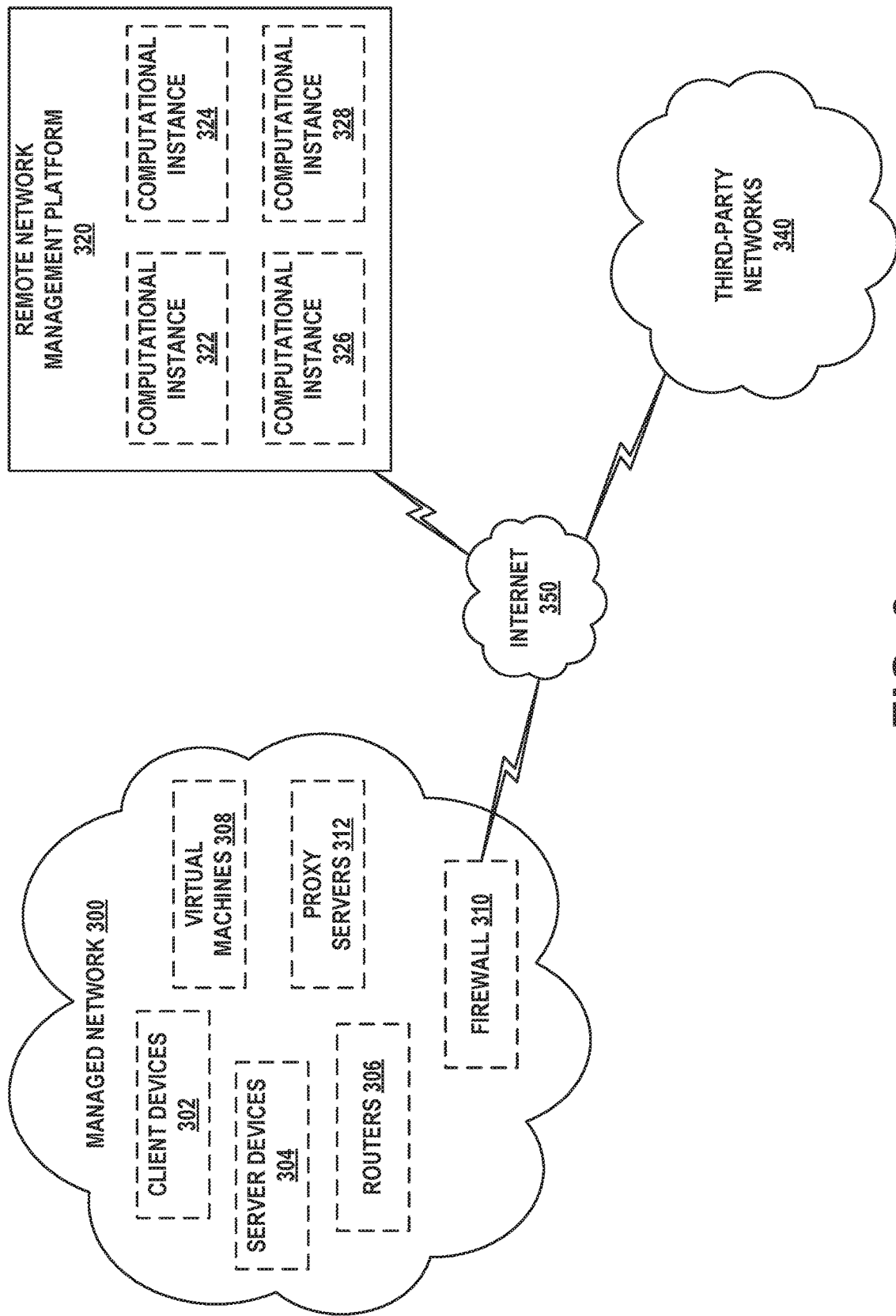
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
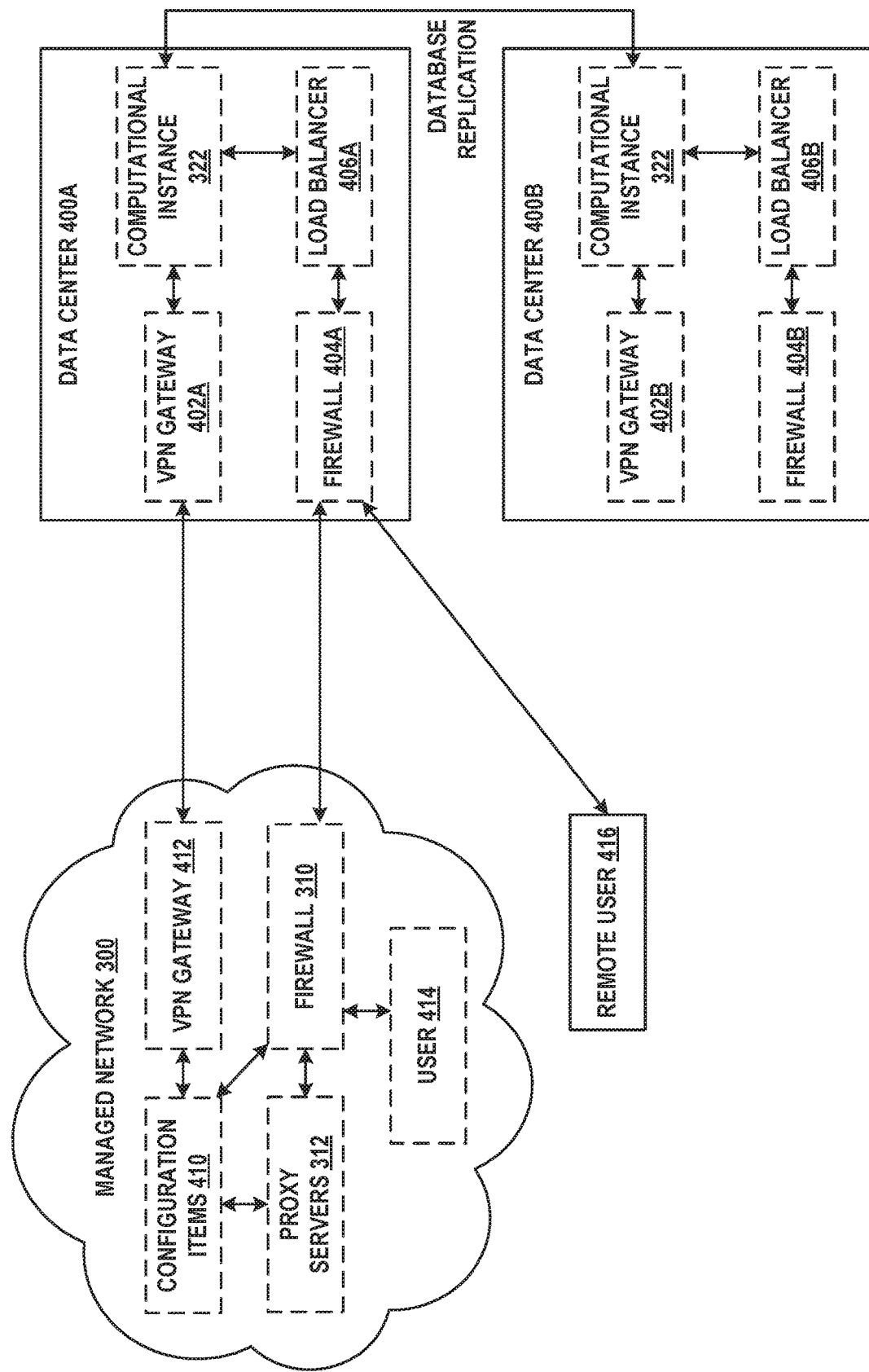
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
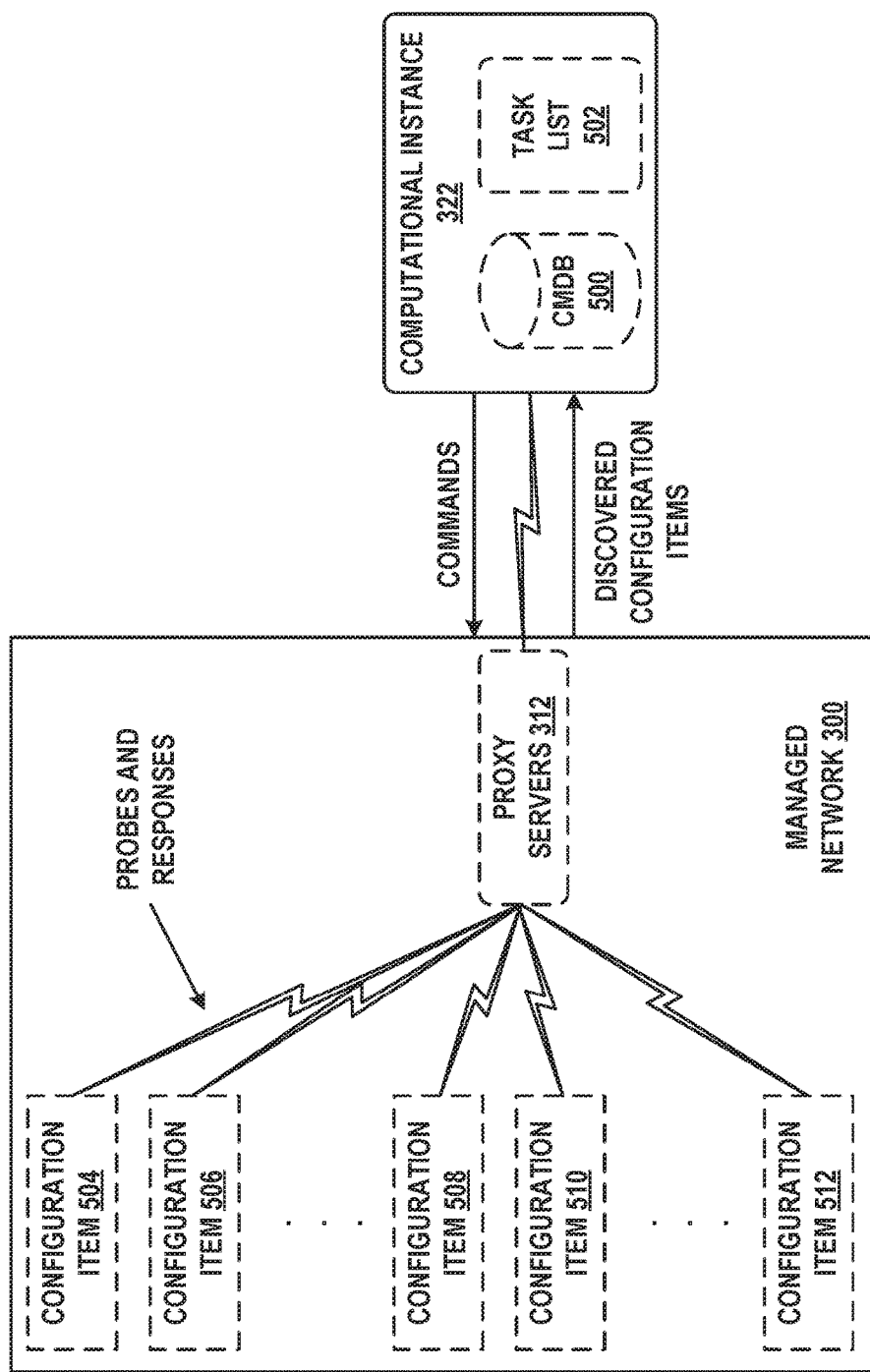
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
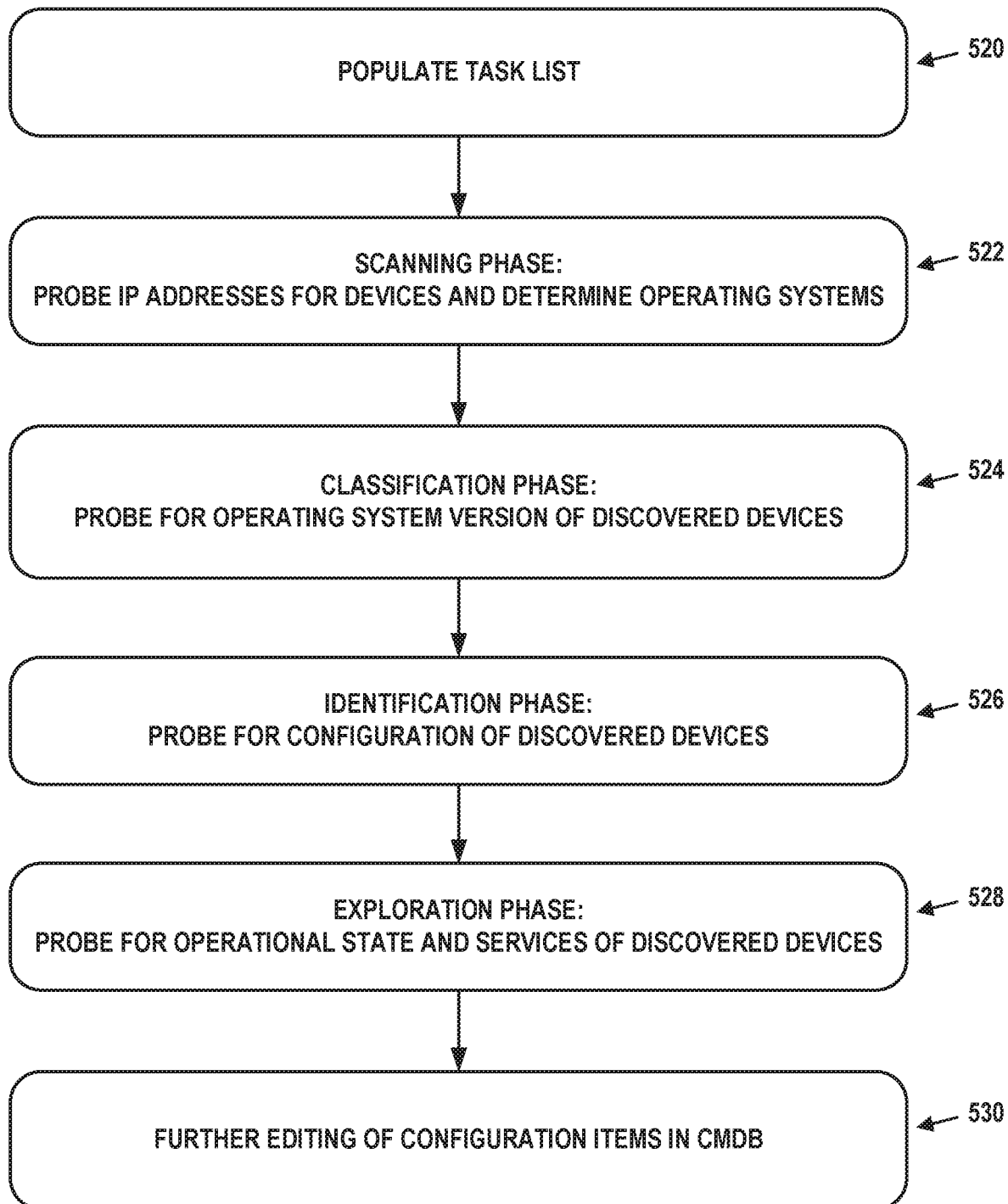
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. MACHINE LEARNING SYSTEMS

Machine learning (ML) can be integrated into a remote network management platform in a number of ways. For example, a central computational instance may provide ML training (e.g., generation of ML models) and/or production (e.g., execution of ML models against specified input) on behalf of one or more computational instances. Alternatively, the computational instances may operate the ML training and/or ML production themselves.

Regardless, the development cycle for ML systems differs significantly from that of traditional programming. Throughout most of the existence of software engineering, programs were developed according to the process illustrated by FIG. 6A. A program 600 was written and tested so that it could receive production input 602 and produce production output 604. Here, "production input" refers to input found in real-world deployments of program 600, and "production output" refers to the output generated by program 600 in response to receiving production input.

Not shown in FIG. 6A is any testing input and its associated testing output that may be used in a similar fashion during development and testing procedures of program 600. Any such testing input could be synthetically or manually generated, for example, with the goal of ensuring that program 600 behaves as expected when subjected to a range of input.

The development of program 600 involves considering possible values of production input 602 and determining what production output 604 should be generated as a result of processing this input. In other words, production input 602 is assumed to be well-defined, and the transformation that maps production input 602 to production output 604 is assumed to be tractable enough to specify algorithmically. More formally, if i represents production input 602 and o represents production output 604, the goal of developing program 600 is to find a function, $f$, such that $o=f(i)$.

But not all problems can be characterized in a fashion that is conducive to such a mapping. For example, so-called "NP hard" problems do not have polynomial-time solutions, and the best that one can hope for are polynomial-time approximations that produce sufficient solutions most of the time. But these approximation algorithms are often difficult to design and develop. Another class of problems that have proven challenging for traditional programming techniques are those that attempt to simulate complex human sensory processing, such as speech recognition, natural language processing, image recognition, and so on.

FIG. 6B depicts a different software engineering process. An ML trainer 610 is a program that takes in training input 612 and training output 614. There often is a one-to-one mapping between each unit of training input 612 and a unit of training output 614, though more complex mappings are possible. Further, it is assumed that training input 612 and training output 614, which are usually combined into a single training data set, are quite large with a significant number of such mappings (e.g., hundreds, thousands, or even millions). This training data set may be referred to as having labeled data, in that each input is labeled with its respective ground-truth or desired output value.

The goal of ML trainer 610 is to iteratively (or otherwise) analyze the mappings to build a computational ML model 616 (e.g., an algorithm) that can, with high probability, produce the training output 614 from training input 612. In other words, for each unit of training input 612, the associated unit of training output 614 will be produced in the vast majority of instances. Furthermore, ML model 616 may be able to produce desirable output even from input that was not used during its training.

The types of ML models, as well as methods through which these ML models can be trained, vary dramatically. For instance, ML model 616 could be an artificial neural network, decision tree, random forest, support vector machine, Bayes classifier, k-means clusterer, linear regression predictor, and so on. But the embodiments herein may be operable with any type of ML technique.

Once tested, ML model 616 may be placed into production. Thus, like program 600, ML model 616 may receive production input 602. However, ML model 616 may produce production output 618 that is different from production output 604. As alluded to above, a well-trained ML model can often produce production output that is superior to that of a traditionally-developed algorithm.

Nonetheless, training ML model 616 can be highly sensitive to the quality of training input 612 and training output 614. If the training data set does not supply a sufficient amount of data or data with sufficiently representative distributions of data, ML model 616 may fail to produce meaningful output. For example, if a particular parameter of the training data set is constant, then ML model 616 may not be able to produce desirable production output when this parameter takes on other values.

Figure 6C:
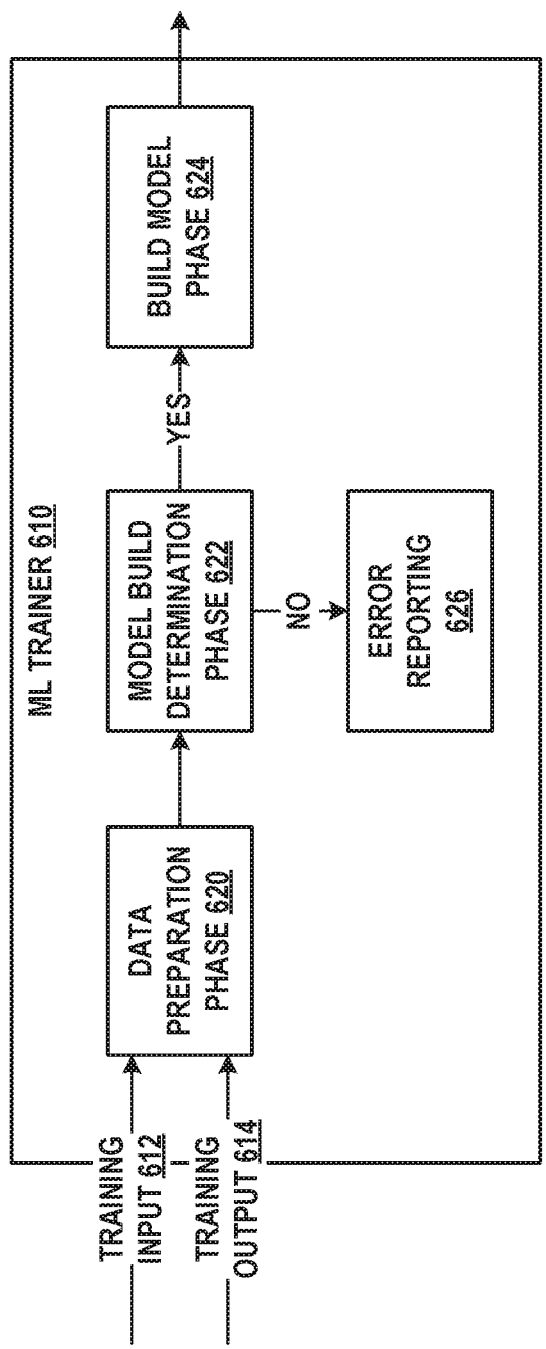
FIG. 6C depicts a training pipeline for machine learning models, in accordance with example embodiments.

Thus, ML trainer 610 may be implemented as a multi-stage pipeline as depicted in FIG. 6C. As shown, ML training includes three phases: data preparation phase 620, model build determination phase 622, and build model phase 624. But in general, ML training may contain more or fewer phases.

Data preparation phase 620 takes training input 612 and training output 614, and then analyzes and transforms this training data set. For example, data preparation phase 620 may remove duplicate entries, normalize the training data set, determine whether any parameters in the training data set have constant values, determine the density of one or more such parameters, and/or determine the distribution of values of one or more such parameters. Additional analysis may occur, and the operations of data preparation phase 620 are not limited to those discussed herein.

The training data set and the results of data preparation phase 620 are then provided to model determination phase 622. The goal of this phase is to determine whether the training data set, as analyzed and/or transformed by data preparation phase 620, can be used to build a meaningful ML model. For instance, if a parameter in the modified training data set has a constant value, a density that is below a threshold density value, or a distribution that is too skewed toward a particular value, ML trainer 610 may involve error reporting module 626 to provide the user with an appropriate error message explaining why an ML model cannot be built. On the other hand, if no parameters of the training data set exhibit these characteristics, build model phase 624 may proceed to build the ML model.

Advantageously, gracefully terminating ML trainer 610 prior to build model phase 624 has a number of advantages. If a meaningful ML model cannot be built from the training data set, then any efforts to do so will waste significant computational resources (e.g., processing cycles and memory). This is particularly the case when the training data set is large and build model phase may take hours or days to complete. Further, the user is provided with an error message that describes the problems with the training data set, affording the user an opportunity to address these problems prior to a further invocation of ML trainer 610.

The embodiments herein provide ways of testing ML trainer 610, in particular data preparation phase 620 and model build determination phase 622 by generating realistic training data sets from an existing master data set. Doing so allows the operations of these phases to be validated based on the characteristics of values in the training data sets. Notably, a data set generator allows a user to specify these characteristics for various values, and then generate a training data set with these characteristics from the master data set. Doing so provides a degree of assurance that ML trainer 610 is going to report errors when it should, thereby saving the aforementioned computational resources from being wasted by building unusable ML models.

A. Example Training Data and Representation Thereof

In order to illustrate training data sets and to explain in more detail what is meant by density and distribution, example data is provided below. While this data is from a particular problem domain (IT incident management), other data relevant to other problem domains may be used.

Natural language processing is a discipline that involves, among other activities, using computers to understand the structure and meaning of human language. This determined structure and meaning may be applicable to the processing of IT incidents, as described below. But incident reports may relate to information other than IT incidents, and may encompass customer service management uses and other uses as well.

Each incident may be represented as an incident report. While incident reports may exist in various formats and contain various types of information, an example incident report 700 is shown in FIG. 7. Incident report 700 consists of a number of fields in the left column, at least some of which are associated with values in the right column.

Field 702 identifies the originator of the incident report, in this case Bob Smith. Field 704 identifies the time at which the incident report was created, in this case 9:56 AM on Feb. 7, 2018. Field 705 is a text string that provides a short description of the problem. Field 706 identifies the description of the problem, as provided by the originator. Thus, field 706 may be a free-form text string containing anywhere from a few words to several sentences or more. Field 708 is a categorization of the incident, and in this case the category is "email". This categorization may be provided by the originator, the IT personnel to whom the incident report is assigned, or automatically based on the context of the problem description field. The category may be selected from a number of category options, such as "email", "VPN", "mobile", "password", etc.

Field 710 identifies the IT personnel to whom the incident report is assigned (if applicable), in this case Alice Jones. Field 712 identifies the status of the incident report. The status may be one of "open," "assigned," "working," or "resolved" for instance. Field 714 identifies how the incident report was resolved (if applicable). This field may be filled out by the IT personnel to whom the incident report is assigned or another individual. Field 716 identifies the time at which the incident report was resolved, in this case 10:10 AM on Feb. 7, 2018. Field 718 specifies the closure code of the incident (if applicable) and can take on values such as "closed (permanently)", "closed (work around)", "closed (cannot reproduce)", etc. Field 720 identifies any additional notes added to the record, such as by the IT personnel to whom the incident report is assigned. Field 722 identifies a link to an online article that may help users avoid having to address a similar issue in the future.

Incident report 700 is presented for purpose of example. Other types of incident reports may be used, and these reports may contain more, fewer, and/or different fields.

Incident reports, such as incident report 700, may be created in various ways. For instance, by way of a web form, an email sent to a designated address, a voicemail box using speech-to-text conversion, and so on. These incident reports may be stored in an incident report database that can be queried. As an example, a query in the form of a text string could return one or more incident reports that contain the words in the text string.

Figure 8:
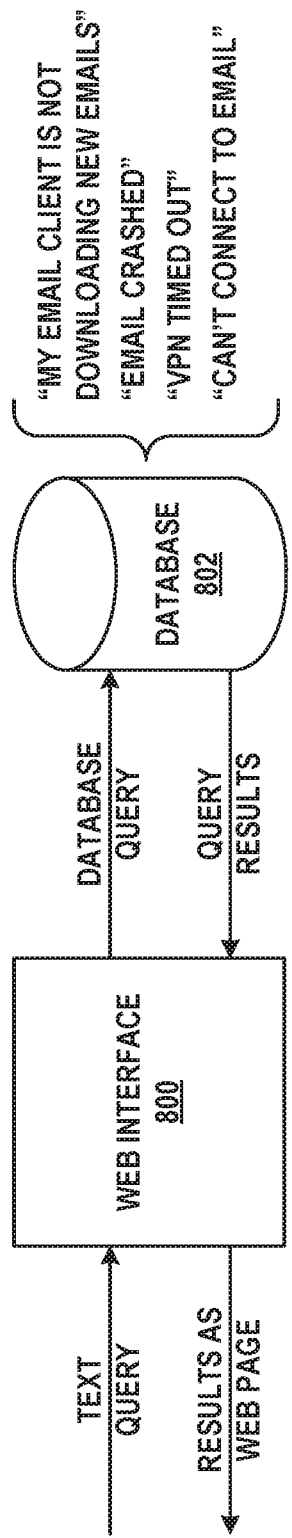
FIG. 8 depicts querying a database for incident reports, in accordance with example embodiments.

This process is illustrated in FIG. 8. A text query may be entered into web interface 800. This web interface may be supplied by way of a computational instance of remote network management platform 320. Web interface 800 converts the text query into a database query (e.g., an SQL query), and provides the SQL query to database 802. This database may be CMDB 500 or some other database. Database 802 contains a number of incident reports with problem description fields as shown in FIG. 7. Regardless, database 802 conducts the query and returns matching results to web interface 800. One or more such results may be returned. Web interface 800 provides these results as a web page.

For example, if the text query is "email", web interface 800 may convert this query into an SQL query of database 802. Database 802 may then look at the problem description field of a table containing incident reports. Any such incident report that matches the query—i.e., includes the term "email"—may be provided in the query results. Thus, the incident reports with the problem descriptions of "My email client is not downloading new emails", "Email crashed", and "Can't connect to email" may be provided, while the incident report with the problem description "VPN timed out" is not returned.

FIG. 9 depicts a database table 900 for storing incident reports. The structure of table 900 may be used in database 802, for example.

The information in table 900 is arranged logically as a set of columns 902. Each of these columns corresponds to a field of incident report 700. Thus, the first column represents field 702 (originator of the incident report), the second column represents field 704 (the time at which the incident report was created), and so on. Each incident report is represented as an entry in table 900, in the form of a row. Thus, row 904A may specific one incident report (e.g., the content of incident report 700), row 904B may specify another incident report, and row 904C may specify yet another incident report. As is implied in FIG. 9, table 900 may contain numerous rows, perhaps hundreds, thousands, or millions.

The example of table 900 will be used below to illustrate the embodiments disclosed herein. Nonetheless, these embodiments may operate on other types of data in other arrangements.

B. Testing a Machine Learning Pipeline

As noted in the discussion of FIG. 6C, an ML pipeline may be configured to gracefully terminate an ML training process prior to building an ML model when the training data set is unlikely to produce a useful ML model. Further, in order to ensure that the ML pipeline only builds an ML model when the training data set is expected to produce a sufficiently useful ML model, the pipeline can be tested with test data sets. It is desirable to be able to generate test data sets with particular distributions of data and values in order to exercise the boundary conditions of the pipeline.

Each of these test data sets should be large, with enough entries (e.g., rows in table 900) to sufficiently exercise various characteristics, features, and thresholds of the ML pipeline. To do so, it is desirable to provide, as testing input to the ML pipeline, a static test data set. This way, results are reproducible when a test is repeated with the same test data set and the same ML model, and various iterations of the ML pipeline can be compared to one another.

But large, meaningful test data sets are hard to come by. Today, there are two approaches for obtaining such data sets, each of which has significant drawbacks.

One technique is to synthetically generate a test data set with content that simulates input the ML pipeline is expected to be subjected to during deployment. The problem with this approach is that it is intractable to generate such a data set with meaningful values. For example, many of the fields in incident report 700 are text blocks consisting of sentence fragments and/or complete sentences. These sentences may be written in proper English (or the proper form of some other language) or may contain slang, vernacular, unusual abbreviations, typographical errors, poor grammar, and misspellings. Even today's deep neural networks cannot generate such text blocks without many of them containing nonsense. Furthermore, the ML pipeline is likely to be quite sensitive to such input and any tests performed with a poor test data set may have meaningless results.

An alternative technique involves manually generating test data sets from real-world data sets. In other words, an individual may be given a large data set from a real-world deployment (e.g., 1,000,000 entries of incident reports). The individual would then create a number of test data sets from this master data set. For example, the individual would be given test cases, each specifying parameters to be tested, such as fields of interest (e.g., fields from incident report 700), density of one such field (e.g., the percentage of non-null entries), and/or distribution of values in such a field (e.g., the percentage of the time that one or more particular values appears in the field).

Herein, a "null" entry may be an entry without a value, or with a nominal or nonce value. In some embodiments, a null value may be an empty string, a value of zero, or some number of binary zeroes. A distribution may specific the relative percentages of various values that the entries for a particular field should take on.

With this specification, the individual would manually edit the master data set until a test data set with the specified characteristics is formed. One of the drawbacks to this approach, however, is the amount of time it would take to do so. A test data set may require 20,000 entries selected from the 1,000,000 in the master data set. Furthermore, the number of test data sets needed for thorough testing may be quite large (e.g., 500) as the number of test cases to fully exercise the ML pipeline can be extensive.

While this results in a laborious and error-prone process, it is also inefficient in terms of storage. For example, if the master data set has 1,000,000 entries, and there are 500 test data sets each with 20,000 entries, the storage requirements are on the order of 11,000,000 times the average size of any entry (1,000,000 for the master data set, 10,000,000 for the test data sets). A text-based entry may average 1-10 kilobytes, resulting in about 11-110 gigabytes of data storage being required per ML model. This amount is excessive even when storage is relatively inexpensive.

VI. QUERY-BASED GENERATION OF TEST DATA SETS

The embodiments herein address the limitations of and improve upon existing ML pipeline testing procedures by dynamically generating test data sets as needed from a master data set gathered from a real-world deployment. The test data sets are specified by a query language expression that matches the requirements of the respective test cases. Thus, the test data sets exhibit the structure and characteristics of the real-world data that is not currently possible to simulate. After a test data set is generated and used for testing, it is deleted, thereby dramatically reducing long-term storage needs. Further, using these test data sets for testing an ML pipeline results in fewer situations in which extensive computational resources are used to generate an ML model that is ultimately non-representative or useless in practice.

The query language expressions herein are based on SQL syntax. However, other query languages and syntaxes could be used without departing from the relevant embodiments. Further, the example query language assumes a database table arranged similarly to that of table 900 upon which to apply the queries. But different database schemas with a different number of tables could be used.

Figure 10:
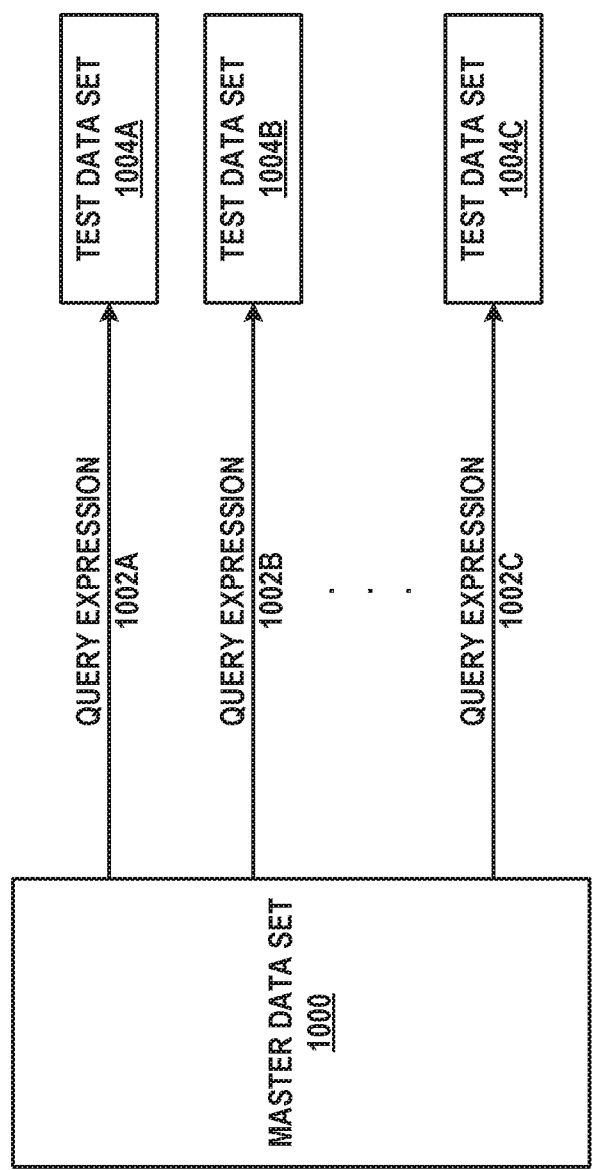
FIG. 10 depicts derivation of test data sets from a master data set, in accordance with example embodiments.

FIG. 10 depicts the general querying process. Master data set 1000 is preferably a real-world data set gathered from a production system (e.g., an IT service management database). As an example, master data set 1000 may be embodied by data arranged in the form of table 900 or in a form similar to that of table 900.

Various query expressions 1002A, 1002B, and 1002C are applied to master data set 1000. This results in the respective test data sets 1004A, 1004B, and 1004C. As noted above, each query expression may filter and/or transform the content of master data set 1000. Thus, it is expected that test data sets 1004A, 1004B, and 1004C are each smaller than master data set 1000 (e.g., containing 1%-20% of the number of entries in master data set 1000).

A. Keywords

An example query language uses several keywords, each associated with respective parameters and operations, and defined below. Within parameters of some of these keywords, filter and transformation expressions may be used. These are also defined below.

1. SELECT

The select keyword specifies columns (e.g., of table 900) that will be represented in the output. The expression "SELECT *" may be used to specify all columns, while the expression "SELECT [col-1, col-2, ... col-n]" may be used to specific one or more columns. For example, assuming that field 702 is designated as "originator" and field 712 is designated "status", the expression SELECT originator,status" will result in a test data set with only columns for field 702 and field 712.

The SELECT keyword may also be used to transform the data in specific columns. This can be helpful when the real-world data in a master data set contains sensitive, private, or personal information. At least three transformation operations may be supported: replacement, translation, and generation.

A replacement operation replaces all instances of a particular substring in the specified column with another string. For example, to replace "string1" with "string2", the expression "SELECT originator.transform[replace("string1", "string2")]" may be used. To replace all of the text in field 712 with "string1", the expression "SELECT originator.transform[replaceWhole("string1")]" may be used. If multiple strings are provided to replaceWhole, these strings may be chosen randomly on a row by row basis.

A translation option translates the text in a particular column of the master data set into another language. The source and destination languages may be specified by short language codes. For example, to translate from English to Spanish, the expression "SELECT originator.transform [translate(en,es)]" may be used.

A generation option may be used to generate random data to place into the columns of the test data set. For example, the expression "SELECT originator.transform[generate (num)]" randomly chooses words from a pre-determined list of size num. By default, these words may have a length of 5 characters, but words of other lengths can be used.

2. FROM

The FROM keyword specifies the local or remote directory path of the file that contains the master data set. In some cases, the path may be omitted and just the file name is specified. For example, the expression "FROM "/usr/home/jsmith/docs/input.csv" specifies a comma-separated value file containing a representation of a table, such as table 900. In some cases, the FROM keyword could be used to refer to a database and a table within the database that contains the master data set.

The FROM keyword also allows use of merge and join operations. Merge operations allow specification of two or more files that, when combined, form the master data set. These operations also allow specification of percentages that indicate how much of the test data set is derived from each of the two or more files. For example, the expression "FROM "input1.csv":40 MERGE "input2.csv":60" obtains, for the test data set, 40% of the rows from the file "input1.csv" and 60% of the rows from the file "input2.csv". To merge two files completely, the percentages can be omitted from the expression.

The FROM keyword also inner join, full join, and left join operations to be performed on two input files. Each of these join operations combines data from rows of the files based on common columns contained in the files. An inner join chooses all rows from the two input files as long as a provided condition is satisfied. A full join combines the rows from both tables, but where the condition was not matched for one table, null values are inserted in the rows. A left join chooses all rows from the first input file (specified on the left side of the operation) and matching rows from the second input file (specified on the right side of the operation). For example, the expression "FROM ["input1.csv" f1 INNER JOIN "input2.csv" f2] ON f1.originator=f2.name" carries out an inner join operation based on the condition f1.originator=f2.name, where f1 is an alias for "input1.csv" and f2 is an alias for "input2.csv".

3. INTO

The INTO keyword specifies the local or remote directory path of the file that is to contain the test data set. In some cases, the path may be omitted and just the file name is specified. For example, the expression "INTO "/usr/home/jsmith/docs/output.csv" specifies a comma-separated value file. The system may write the test data set (i.e., the master data set as filtered and/or transformed by the query expression) into this file. In some cases, a database table may be specified for output rather than a file.

4. WHERE

The WHERE keyword specifies condition(s) on which to filter the rows in the master data set. The general structure a WHERE expression is "WHERE colName#colType.filter=value", where colName is the name of a column in the master data set, colType is a type of the column, filter is the filter to apply to the column, and value is the value specified for the filter.

The types of columns specified in colType may be, for example, dates, integers, floating points, text, and categorical values. Categorical values are selected from a predefined list, such as "red", "green", and "blue", or "cat", "dog", and "mouse".

Filters are applied in specific ways to particular column types. For instance, the date, integer, and floating point column types can be filtered based on a minimum value, maximum value, and/or a density. The text column type can be filtered based on a density. The categorical value column type can be filtered based on a distribution and/or a density. A density specifies the percentage of rows that will have non-null values in the output file. A distribution specifies the percentage(s) of one or more categories to which the data in the output file will adhere.

As an example, the expression "WHERE created#date.min=2018-03-07-02:22:06" filters the input file(s) so that only rows with values of the field 704 equal to or later than 2018-03-07-02:22:06 are present in the output file. As another example, the expression "WHERE created#date.max=2018-03-07-02:22:06" filters the input file(s) so that only rows with values of the field 704 equal to or earlier than 2018-03-07-02:22:06 are present in the output file. As yet another example, the expression "WHERE resolved#numerical.density=50" filters the input file(s) so that 50% of the rows have non-null values for the field 716. As a further example, the expression "WHERE category#categorical.distribution=[email:60, VPN:40]" filters the input file(s) so that 60% of the rows have a value of "email" for the field 708 and 40% of the rows have a value of "VPN" for the field 708.

In various embodiments, additional filter parameters may be used, alone or in combination with other filter parameters. For example, a "mean=X" filter parameter may be applied so that the numerical values in selected columns have a mean value of X. Similarly, filter parameters specifying a median, standard deviation, inter-quartile range, or any other statistical measure may be used. Furthermore, filters may also be used to transform numerical values in selected columns. As examples, filters applying log( ), square( ), squareroot( ), absolutevalue( ), sine( ), cosine( ), or any other mathematical function may be used. Moreover, filters may also apply user-defined operations and/or functions. For instance, a user may define an arbitrarily complex function using a script (e.g., JavaScript code) that can be used to filter, transform, or select values in rows of one or more columns.

5. LIMIT

The LIMIT keyword specifies how many rows are to be placed into the output file. For example, the expression "LIMIT 20000" specifies that the output file should contain 20,000 rows.

B. Example Query Expressions

| Query 1 |
|---|
| SELECT short_description, category, status<br>INTO "output.csv"<br>FROM "input, csv"<br>WHERE category#categorical.density = 60<br>LIMIT 25000 |

Given the keywords above and their defined usage, numerous powerful queries can be formed by combining them in various ways. For example, Query 1 selects 25,000 rows from input file "input.csv" and writes these rows to output file "output.csv". Only row values for the columns of fields 705, 708, and 712 are written. Further, the density of field 708 is set to 60%, which means that 40% of the rows will have a null value for this field.

| Query 2 |
|---|
| SELECT originator.transform[replaceWhole("user1","user2")],<br>    short_description, category<br>INTO "output.csv"<br>FROM "input1.csv":30 MERGE "input2.csv":70<br>WHERE category#categorical.density = 60,<br>    category#categorical.distribution = [email:50, VPN:50]<br>LIMIT 10000 |

In another example, Query 2 is similar to Query 1, except that it selects only 10,000 rows and does so from a 30%/70% merge of the files input1.csv and input2.csv. Furthermore, the column for field 702 is present in the output file, but values in the rows of this column are randomly selected from the strings "user1" and "user2". Also, the distribution of values for this field is set to 50% email/50% VPN.

Numerous additional queries may be formed by combining the keywords and their parameters in various ways. Thus, the embodiments herein are not limited by the queries shown.

C. Example Query Processing

Figure 11:
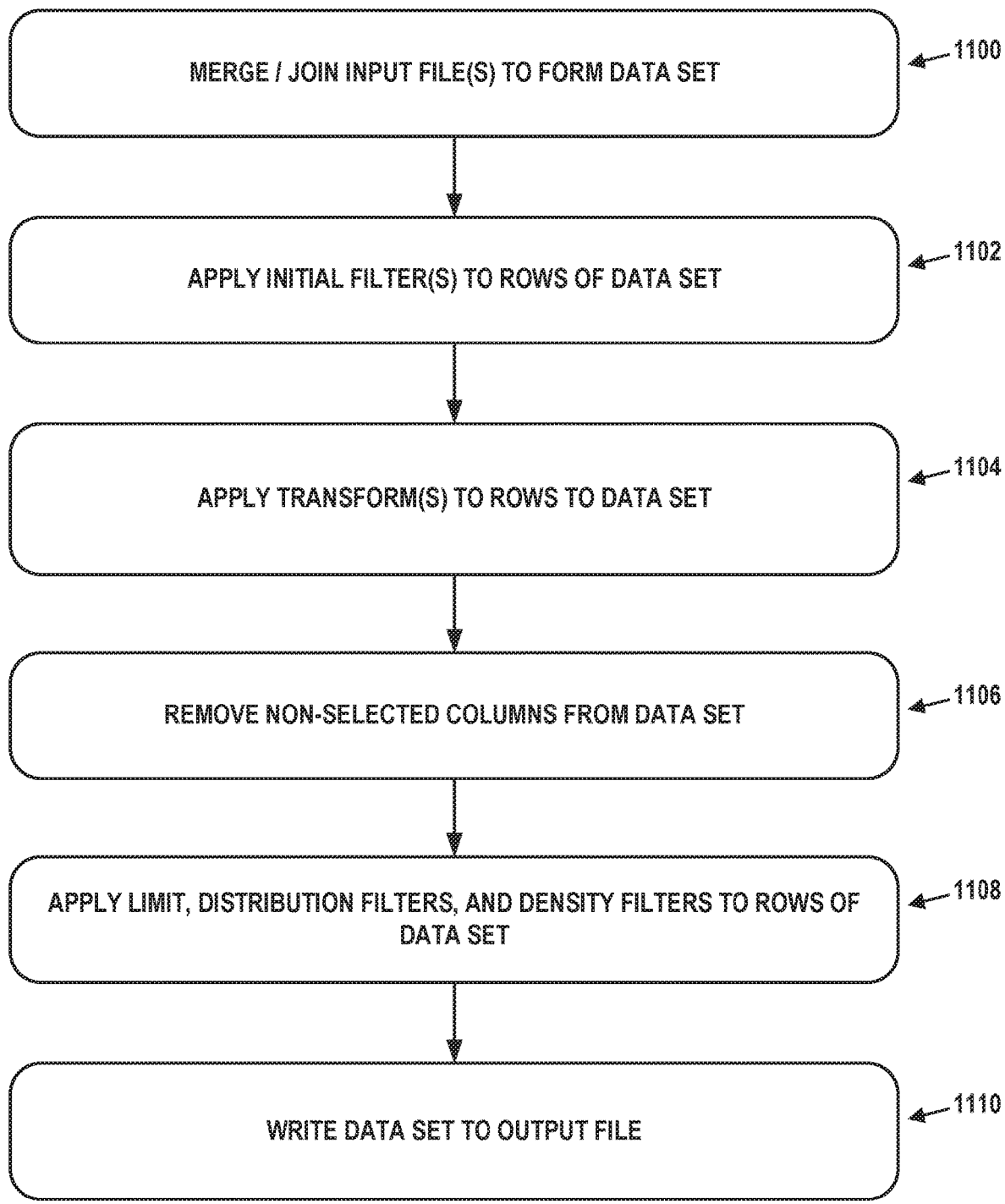
FIG. 11 is a flow chart, in accordance with example embodiments.

FIG. 11 provides an example series of steps that can be applied to carry out the processing of a query on a master data set. FIG. 11 provides a specific ordering of steps that may be efficient in some cases. Alternative embodiments may use different steps and/or a different ordering of steps.

At step 1100, multiple specified input files are merged or joined, if applicable. The result is a single master data set. At step 1102, initial filters are applied to the data set. These filters may include any that reduce the size of the data set, such as date-based filters, integer-based filters, and float-point-based filters. A motivation for applying these filters early is that they may serve to reduce the size of the data set, thereby making following operations less costly in terms of processing time and memory utilization.

At step 1104, any transforms are applied to the data set, and at step 1106, non-selected columns are removed from the data set. At step 1108, the limit expression (if present) as well as distribution filters and density filters are applied to the data set. This is done in one step in order to ensure that the distribution and density filters are applied based on the number of rows in the final version of the data set. At step 1110, the data set is written to an output file.

In other embodiments, these steps could take place in a different order. For example, steps 1104 and 1106 could take place earlier or later than shown.

Regardless, with appropriate query expressions, the resulting data sets can be used to test specific scenarios of an ML pipeline that would be prohibitively difficult to test in any other known way. For example, if the minimum density required by the ML pipeline for a particular column is 70%, the embodiments herein could test this threshold with a first test data set that has 69.9% density for the column, and a test second data set that has 70.1% density for the column. The first test should cause the ML pipeline to raise an error and not generate an ML model, while the second test should cause the ML pipeline to generate an ML model (assuming that all other pipeline requirements are met by the data set).

VII. EXAMPLE OPERATIONS

Figure 12:
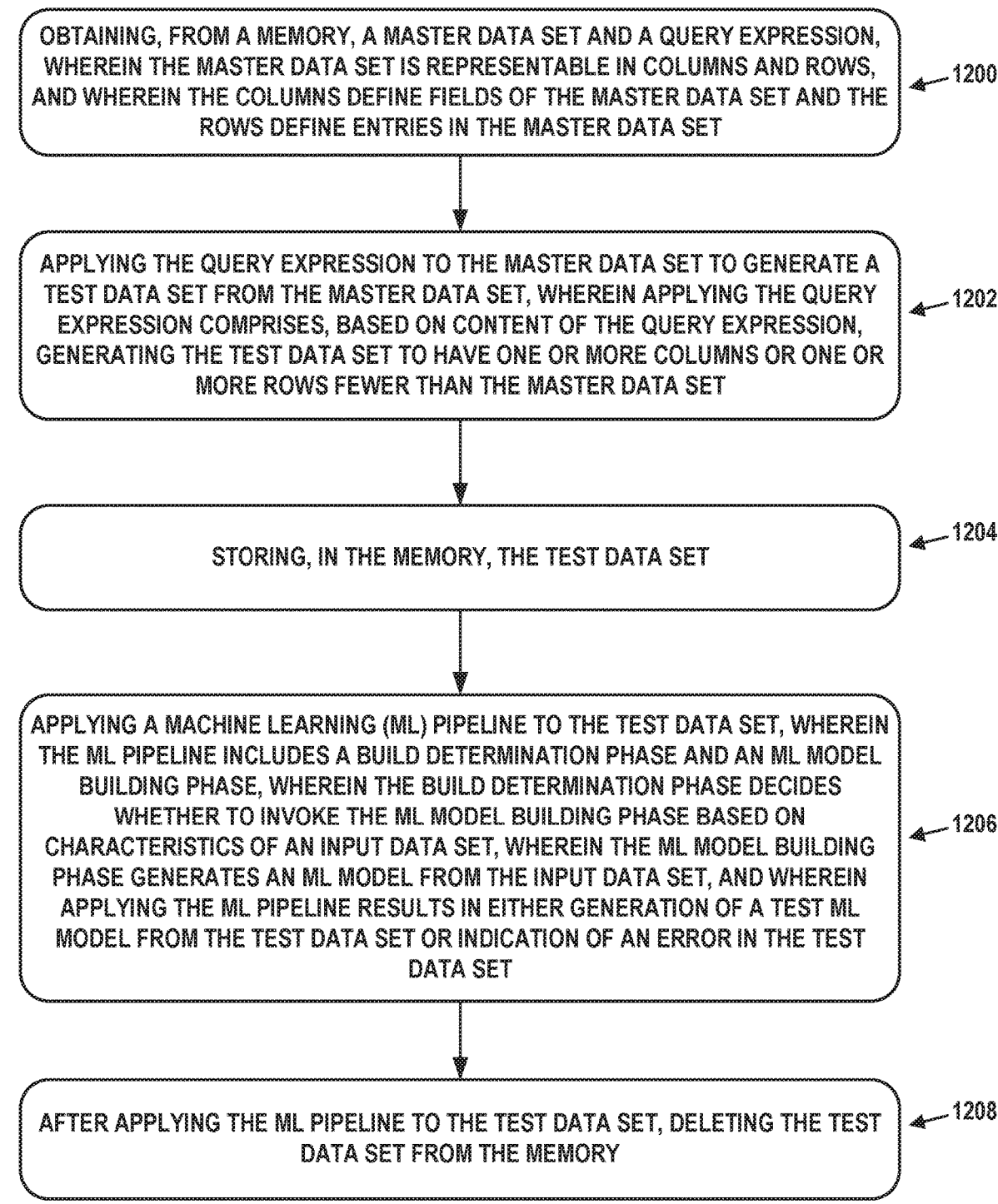
FIG. 12 is a flow chart, in accordance with example embodiments.

FIG. 12 is a flow chart illustrating an example embodiment. The process illustrated by FIG. 12 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 12 may be simplified by the removal of any one or more of the features shown therein. Further, these embodiments may be combined with features, aspects, and/or implementations of any of the previous figures or otherwise described herein.

Block 1200 may involve obtaining, from a memory, a master data set and a query expression, where the master data set is representable in columns and rows, and where the columns define fields of the master data set and the rows define entries in the master data set.

Block 1202 may involve applying the query expression to the master data set to generate a test data set from the master data set, where applying the query expression comprises, based on content of the query expression, generating the test data set to have one or more columns or one or more rows fewer than the master data set.

Block 1204 may involve storing, in the memory, the test data set.

Block 1206 may involve applying an ML pipeline to the test data set, where the ML pipeline includes a build determination phase and an ML model building phase, where the build determination phase decides whether to invoke the ML model building phase based on characteristics of an input data set, where the ML model building phase generates an ML model from the input data set, and where applying the ML pipeline results in either generation of a test ML model from the test data set or indication of an error in the test data set.

Block 1208 may involve, after applying the ML pipeline to the test data set, deleting the test data set from the memory.

In some embodiments, the memory, the software application, and the computing device are disposed within a computational instance of a remote network management platform, and the master data set was derived from activity that took place on a managed network associated with the computational instance. In some cases, the computational instance is a centralized computational instance shared by a plurality of managed networks, and the managed network accesses the central computational instance by way of a particular computational instance that is dedicated to the managed network.

In some embodiments, obtaining the master data set comprises: (i) determining that the query expression specifies combining two or more input files; and (ii) performing a merge or a join operation on the two or more input files to generate the master data set.

In some embodiments, the query expression specifies one or more of the columns, and applying the query expression to the master data set comprises generating the test data set to have only the columns that were specified.

In some embodiments, the query expression specifies replacing instances of a string in a particular one of the columns with a replacement string, and applying the query expression to the master data set comprises: (i) finding each of the instances of the string in the particular one of the columns; and (ii) representing, in the test data set, each of the instances of the string with the replacement string.

In some embodiments, the query expression specifies replacing rows of text in a particular one of the columns with one of a plurality of replacement strings, and applying the query expression to the master data set comprises representing, in the test data set, rows of text in a particular one of the columns with a string randomly selected from the plurality of replacement strings.

In some embodiments, the query expression specifies translating rows of text in a particular one of the columns from a first language to a second language, and applying the query expression to the master data set comprises: (i) transmitting, to an external application programming interface, the rows of text; (ii) receiving, from the external application programming interface, the rows of text as translated into the second language; and (iii) representing, in the test data set, the rows of text with the translations thereof.

In some embodiments, the master data set is stored in an input file, the query expression specifies the input file as a source and an output file as a destination, and applying the query expression to the master data set comprises: (i) reading, from the input file, the master data set; and (ii) writing, to the output file, the test data set.

In some embodiments, the query expression contains a filter to be applied to a particular one of the columns, the filter is based on a type of content in the particular one of the columns, and applying the query expression to the master data set comprises representing, in the test data set, only rows with entries for the particular one of the columns that match the filter. In some cases, the filter specifies a range of values or a text string. Alternatively or additionally, the filter specifies a density for the particular one of the columns, and representing, in the test data set, only rows with entries for the particular one of the columns that match the filter comprises representing, in the test data set, rows with null and non-null values with in accordance with the density. Alternatively or additionally, the filter specifies a distribution for the particular one of the columns, and representing, in the test data set, only rows with entries for the particular one of the columns that match the filter comprises representing, in the test data set, rows that exhibit values in accordance with the distribution. Alternatively or additionally, the filter specifies a user-defined operation for the particular one of the columns, and representing, in the test data set, only rows with entries for the particular one of the columns that match the filter comprises representing, in the test data set, rows that exhibit values in accordance with the user-defined operation.

In some embodiments, the query expression specifies a limit to rows in the test data set, and generating the test data set to have one or more columns or one or more rows fewer than the master data set comprises generating the test data set to have no more than a number of rows defined by the limit.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   memory containing: (i) a master data set representable in columns and rows, wherein the columns define fields of the master data set and the rows define entries in the master data set, and (ii) a query expression;
   a software application configured to apply a machine learning (ML) pipeline to a test data set, wherein the ML pipeline includes a build determination phase and an ML model building phase, wherein the build determination phase decides whether to invoke the ML model building phase based on characteristics of the test data set, and wherein the ML model building phase generates an ML model from the test data set; and
   a computing device configured to:
   obtain, from the memory, the master data set and the query expression;
   apply the query expression to the master data set to generate the test data set from the master data set, wherein applying the query expression comprises, based on content of the query expression, generating the test data set to have one or more columns or one or more rows fewer than the master data set, wherein the query expression specifies one or more columns of the master data set, one or more rows of the master data set, or a combination thereof;
   store, in the memory, the test data set;
   apply, by way of the software application, the ML pipeline to the test data set, wherein applying the ML pipeline results in either generation of a test ML model from the test data set or indication of an error in the test data set; and
   in response to applying the ML pipeline to the test data set, delete the test data set from the memory.

2. The system of claim 1, wherein the memory, the software application, and the computing device are disposed within a computational instance of a remote network management platform, and wherein the master data set was derived from activity that took place on a managed network associated with the computational instance.

3. The system of claim 2, wherein the computational instance is a centralized computational instance shared by a plurality of managed networks, and wherein the managed network accesses the central computational instance by way of a particular computational instance that is dedicated to the managed network.

4. The system of claim 1, wherein obtaining the master data set comprises:
   determining that the query expression specifies combining two or more input files; and
   performing a merge or a join operation on the two or more input files to generate the master data set.

5. The system of claim 1, wherein applying the query expression to the master data set comprises:
   generating the test data set to have only the one or more columns that were specified, only the one or more rows that were specified, or a combination thereof.

6. The system of claim 1, wherein the query expression specifies replacing instances of a string in a particular one of the columns with a replacement string, and wherein applying the query expression to the master data set comprises:
   finding each of the instances of the string in the particular one of the columns; and
   representing, in the test data set, each of the instances of the string with the replacement string.

7. The system of claim 1, wherein the query expression specifies replacing rows of text in a particular one of the columns with one of a plurality of replacement strings, and wherein applying the query expression to the master data set comprises:
   representing, in the test data set, rows of text in a particular one of the columns with a string randomly selected from the plurality of replacement strings.

8. The system of claim 1, wherein the query expression specifies translating rows of text in a particular one of the columns from a first language to a second language, and wherein applying the query expression to the master data set comprises:
   transmitting, to an external application programming interface, the rows of text;
   receiving, from the external application programming interface, the rows of text as translated into the second language; and
   representing, in the test data set, the rows of text with the translations thereof.

9. The system of claim 1, wherein the master data set is stored in an input file, wherein the query expression specifies the input file as a source and an output file as a destination, and wherein applying the query expression to the master data set comprises:
   reading, from the input file, the master data set; and
   writing, to the output file, the test data set.

10. The system of claim 1, wherein the query expression contains a filter to be applied to a particular one of the columns, wherein the filter is based on a type of content in the particular one of the columns, and wherein applying the query expression to the master data set comprises:
   representing, in the test data set, only rows with entries for the particular one of the columns that match the filter.

11. The system of claim 10, wherein the filter specifies a range of values or a text string.

12. The system of claim 10, wherein the filter specifies a density for the particular one of the columns, and wherein representing, in the test data set, only rows with entries for the particular one of the columns that match the filter comprises:
representing, in the test data set, rows with null and non-null values with in accordance with the density.

13. The system of claim 10, wherein the filter specifies a distribution for the particular one of the columns, and wherein representing, in the test data set, only rows with entries for the particular one of the columns that match the filter comprises:
representing, in the test data set, rows that exhibit values in accordance with the distribution.

14. The system of claim 10, wherein the filter specifies a user-defined operation for the particular one of the columns, and wherein representing, in the test data set, only rows with entries for the particular one of the columns that match the filter comprises:
representing, in the test data set, rows that exhibit values in accordance with the user-defined operation.

15. The system of claim 1, wherein the query expression specifies a limit to rows in the test data set, and wherein generating the test data set to have one or more columns or one or more rows fewer than the master data set comprises:
generating the test data set to have no more than a number of rows defined by the limit.

16. A computer-implemented method comprising:
obtaining, by a computing device and from a memory, a master data set and a query expression, wherein the master data set is representable in columns and rows, and wherein the columns define fields of the master data set and the rows define entries in the master data set;
applying, by the computing device, the query expression to the master data set to generate a test data set from the master data set, wherein applying the query expression comprises, based on content of the query expression, generating the test data set to have one or more columns or one or more rows fewer than the master data set, wherein the query expression specifies one or more columns of the master data set, one or more rows of the master data set, or a combination thereof;
storing, by the computing device and in the memory, the test data set;
applying, by the computing device, a machine learning (ML) pipeline to the test data set, wherein the ML pipeline includes a build determination phase and an ML model building phase, wherein the build determination phase decides whether to invoke the ML model building phase based on characteristics of an input data set, wherein the ML model building phase generates an ML model from the input data set, and wherein applying the ML pipeline results in either generation of a test ML model from the test data set or indication of an error in the test data set; and
in response to applying the ML pipeline to the test data set, deleting, by the computing device, the test data set from the memory.

17. The computer-implemented method of claim 16, wherein the query expression specifies replacing rows of text in a particular one of the columns with one of a plurality of replacement strings, and wherein applying the query expression to the master data set comprises:
representing, in the test data set, rows of text in a particular one of the columns with a string randomly selected from the plurality of replacement strings.

18. The computer-implemented method of claim 16, wherein the query expression contains a filter to be applied to a particular one of the columns, wherein the filter is based on a type of content in the particular one of the columns, and wherein applying the query expression to the master data set comprises:
representing, in the test data set, only rows with entries for the particular one of the columns that match the filter.

19. The computer-implemented method of claim 18, wherein the filter specifies a density for the particular one of the columns, and wherein representing, in the test data set, only rows with entries for the particular one of the columns that match the filter comprises:
representing, in the test data set, rows with null and non-null values with in accordance with the density.

20. An article of manufacture including a non-transitory computer-readable medium, having stored thereon program instructions that, upon execution by a computing system, cause the computing system to perform operations comprising:
obtaining, from a memory, a master data set and a query expression, wherein the master data set is representable in columns and rows, and wherein the columns define fields of the master data set and the rows define entries in the master data set;
applying the query expression to the master data set to generate a test data set from the master data set, wherein applying the query expression comprises, based on content of the query expression, generating the test data set to have one or more columns or one or more rows fewer than the master data set, wherein the query expression specifies one or more columns of the master data set, one or more rows of the master data set, or a combination thereof;
storing, in the memory, the test data set;
applying a machine learning (ML) pipeline to the test data set, wherein the ML pipeline includes a build determination phase and an ML model building phase, wherein the build determination phase decides whether to invoke the ML model building phase based on characteristics of the test data set, wherein the ML model building phase generates an ML model from the test data set, and wherein applying the ML pipeline results in either generation of a test ML model from the test data set or indication of an error in the test data set; and
in response to applying the ML pipeline to the test data set, deleting the test data set from the memory.

* * * * *